United States Patent Office 3,461,188
Patented Aug. 12, 1969

3,461,188
POLYBLENDS PREPARED BY POLYMERIZING VINYL MONOMERS IN THE PRESENCE OF CROSS-LINKED RUBBER
Massimo Baer, Longmeadow, Mass., assignor to Monsanto Company, a corporation of Delaware
No Drawing. Filed Aug. 23, 1965, Ser. No. 481,904
Int. Cl. C08f 29/50, 29/56, 41/10
U.S. Cl. 260—878                     10 Claims

ABSTRACT OF THE DISCLOSURE

Disclosed herein is a process for the mass polymerization of certain monomers in the presence of unsaturated rubbers. These rubbers are cross-linked after phase inversion occurs yielding products, also claimed, having improved physical and mechanical properties, such as impact strength.

---

This invention relates to polyblends. More particularly, this invention relates to polyblends prepared from rubbery elastomers which contain pendant unsaturation.

Polyblends prepared by polymerizing a monomer or mixture of monomers in the presence of a saturated rubber by conventional polymerization procedures display inferior mechanical properties. The reason for this deficiency is traced to the inability of the rubber phase particles to maintain their size or particulate structure upon processing. Polyblends usually possess rubber phase particles of the desired size and discreteness at the end of the polymerization cycle. However, when exposed to shear, such as in extrusion or on processing, the rubber particles being uncross-linked or insufficiently cross-linked, are broken up and deformed to form small size laminar particles. The rubber particles are no longer particulate and discrete but are smeared together with no well defined shape and structure. This deformation of discrete particles into laminae causes a general degradation of physical properties and a decrease in the impact strength and elongation in tension of the final product.

In order to obtain blends of the desired toughness it is necessary that the rubber be modified by grafting. Generally, it is desirable that branches grafted on the rubber backbone be of the same or similar composition of that of the matrix (rigid phase). The function of these grafted branches is believed to be that of improving the adhesion between the dispersed rubber phase particles and the rigid matrix.

However, many polyblends prepared according to conventional methods contain excessive grafting of the rubber phase which excessive grafting is generally found to be damaging to mechanical properties. The grafted rubber may become excessively compatible with the rigid phase and lead to an excessively small rubber phase particle size dispersion with resulting inferior polyblend properties.

Another shortcoming of current polyblends is the use of rubbers which contain large numbers of residual double bonds in the rubber backbone. These double bonds are readily attacked by light and oxygen, causing poor weatherability in the final polymeric product.

It is an object of this invention to provide polyblends of a rigid phase and a rubber phase wherein the rubber phase contains pendant unsaturation, which is eventually used to produce a limited number of grafting sites.

Another object of this invention is to provide polyblands of a rigid phase and a rubber phase wherein the rubber phase contains pendant unsaturation, which is eventually used to cross-link the rubber in order to enable the dispersed rubber phase to preserve its particulate size and structure even upon extrusion or other processing to produce a polymeric product with improved physical and mechanical properties.

Another object is to provide a process or the preparation of polyblends of a rigid phase and a rubber phase wherein the rubber phase contains pendant unsaturation, which is eventually used to produce a limited number of grafting sites.

Another object is to provide a process for the preparation of polyblends of a rigid phase and a rubber phase wherein the rubber phase contains pendant unsaturation, which is eventually used to cross-link the rubber in order to enable the dispersed rubber phase to preserve its particulate size and structure even upon extension or other processing to produce a polymeric product with improved physical and mechanical properties.

These and other objects are achieved by a polyblend comprising (A) from 80 to 98 percent by weight, based on the weight of the total composition, of a rigid polymer which is the polymerization product of at least one monomer selected from the group consisting of methylmethacrylate, acrylonitrile and alkenyl aromatic monomers of the general formula:

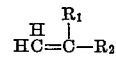

wherein $R_1$ is selected from the group consisting of hydrogen and methyl and $R_2$ is an aromatic radical of from 6 to 10 carbon atoms, and (B) from 2 to 20 percent by weight, based on the wieght of the total composition, of a cross-linked elastomeric polymer; said elastomer having a particle size of from 0.5 to 10 microns; prepared by a process which comprises dissolving from 2 to 20 percent by weight based on the weight of the total composition of a substantially non-cross-linked elastomeric polymer with pendant unsaturation in from 80 to 98 percent by weight of the monomeric phase of part (A) above; mass polymerizing the mixture to about from 5 to 30% conversion to cause inversion of the continuous rubber phase to a dispersed rubber phase of discrete particles, cross-linking the discrete rubber particles after phase inversion and completing the polymerization of the monomeric phase.

This invention may be described as follows. A suitable rubber is dissolved or evenly dispersed in the desired monomeric components (both of which are described below) to form a continuous rubber in monomer phase or a homogenous dispersion of rubber in monomer.

Polymerization of the monomeric phase using a high temperature peroxide initiator is then carried out to about from 5 to 30% conversion. This period of polymerization to about from 5 to 30% conversion is referred to as the initial polymerization period. During this initial polymerization period a phase inversion occurs, i.e., the rubber in monomer phase which initially constituted the continuous phase is transformed into a discontinuous phase. Thus, discrete rubber particles, swollen in monomer, become dispersed in the continuous phase now constituted by the matrix-monomer solution.

After the initial polymerization step the syrup containing the described rubber/monomer/polymer mixture is dispersed in water and the polymerization of the monomer phase is completed.

The invention contemplates the use of such conventional polymerization aids as chain transfer agents, surfactants, protective colloids, etc., throughout the initial polymerization and polymerization step.

It is during the phase inversion period that the size and structure of the rubber particles is determined. The essential step is to fix the size and structure of these rubber particles formed during phase inversion so that they can resist the deformation and break-up caused by the extreme conditions of high temperatures and high shear forces created during extrusion, molding and other processing.

The size and structure of the rubber particles is fixed by cross-linking before the particles are subjected to the shearing forces of extrusion and processing at high temperatures. The cross-linking is conveniently carried out by the judicious selection of a method which will cause the available pendant unsaturation of the rubber to react to form a three dimensional network without adversely affecting the rigid phase. One such method comprises the use of polymerization initiators such as t-butyl hydroperoxide, cumene hydroperoxide, p-menthane hydroperoxide, cyclohexanone peroxide, methyl ethyl ketone peroxide, ditertiary butyl peroxide, tertiary butyl peracetate, etc.

The initiator selected should preferably be a high temperature peroxide, i.e., a peroxide whose decomposition temperature and half-life is such that sufficient initiator is available for cross-linking the rubber either shortly after phase inversion or at the end of the polymerization period.

A variation in this method is the post addition of a peroxide initiator after the phase inversion step to insure adequate amounts for cross-linking.

The use of heat alone to cross-link the rubber phase has been found to be inadequate to achieve the necessary results. Such methods as gamma radiation are suitable only if the dose and intensity of radiation such as required to cross-link the rubber does not result in excessive damage to the rigid phase. Polystyrene is found to be a particularly favorable matrix because of its relatively low sensitivity to radiation.

Rubbery polymers suitable for use in the practice of this invention must meet certain critical requirements, such as containing pendant unsaturation which may be used to crosslink the rubbery phase in order to preserve the particulate size and structure of the rubber during and after processing. The reactivity of these pendant double bonds is critical and must be of an order wherein the rubber will not readily enter into copolymerization or provide excessive grafting sites for the monomers of the rigid phase, yet the double bonds must be reactive enough to allow the rubber to be readily cross-linked prior to processing so as to preserve the desired size and structure of the rubber phase particles.

The rubbers suitable for the practice of this invention may be prepared by the direct copolymerization of a diolefin with another monomer or combination of monomers which are ordinarily used to prepare an elastomeric polymer. The diolefin should contain (1) unsaturation of the type which will enable the monomer to readily copolymerize with those monomers or combination of monomers which make up the elastomeric polymer and (2) unsaturation of the type that can be used to crosslink the rubber yet will not readily enter into copolymerization with the monomers used to prepare the rubber and will not readily copolymerize with or provide grafting sites for the monomers that make up the rigid phase. Furthermore, the diolefin should result in a rubber which is soluble or readily and uniformly dispersible in the monomers.

Preferred diolefins are those of from 5 to 22 carbon atoms wherein only one double bond is terminal, thus increasing the probability that the other double bond will not enter the rubber backbone during polymerization but will remain available for subsequent cross-linking. Examples of suitable diolefins include 1,4-hexadiene; 1,6-octadiene; 6-methyl-1,5-heptadiene; 7-methyl-1,6-octadiene; 11-ethyl-1,11-tridecadiene; cyclooctadiene; 5,7-dimethyl-1,6-octadiene methylene norbornylene and the like. Also useful as a diolefinic termonomer are the esters of acrylic acid and its homologs and unsaturated alcohols such as undecylenyl, oleyl, methallyl, hexenyl alcohols, etc.

The monomers which may be copolymerized with the diolefin in order to prepare the rubbers which are employed in the practice of this invention include acrylates such as ethyl acrylate, butyl acrylate, 2-ethylhexyl acrylate, etc., and mixtures thereof. Another choice of monomers would include mixtures of ethylene with other alpha olefins such as propylene, butylene, pentene, etc. Especially preferred are those elastomers which are the copolymerization product of ethylene/propylene/diolefin monomers.

Equally useful as monomers which may be copolymerized with the diolefin in the preparation of rubbers with pendant unsaturation are copolymers of ethylene with vinyl ester type monomers such as vinyl formate, vinyl acetate, vinyl propionate, or combinations of ethylene with vinyl ethers such as methyl vinyl ether, ethyl vinyl ether, vinyl 2-methoxyethyl ether, vinyl 2-chloroethyl ether, etc. Preferred among this type are those elastomers which are the copolymerization product of ethylene/vinyl acetate/diolefin monomers.

Other suitable starting combinations would include a diolefin with isobutylene, ethylene-vinyl chloride, etc.

In the foregoing rubbers a diolefin content of from 1 to 20% by weight is preferred with a content of from 1 to 12% by weight being especially preferred.

The solubility of the rubber in the monomer portion may be promoted by heating the rubber/monomer mixture to an elevated temperature and/or adding organic solvent to the monomer portion which will act as a diluent and help dissolve the rubber. The selection of a diluent should be based on the solubility parameters of the rubber, the monomer and the diluent. In general, the diluent should have a solubility parameter such that the delta value of the monomer diluent mixture is close to that of the rubber used. The backbone of the rubbery polymer should also be essentially free of unsaturation because this unsaturation is susceptible to attack by light and oxygen and results in degradation of the final polymeric product.

Another method for preparing the rubber phase comprises hydrolyzing an olefin-ester type copolymer and subsequently esterifying at least some of the resultant hydroxyl groups with an acid which contains an unsaturated acyloxy group; e.g., hydrolysis of ethylene/vinyl acetate followed by esterification of at least some of the hydroxyl groups with acrylic acid or its homologs, or with crotonic acid, oleic acid, etc. However, the amount of unsaturation must be controlled to prevent excessive grafting and/or gelatin as these double bonds are more reactive than the internal bonds of the diolefin. About 0.1% to 0.3% acrylic acid content in modified EVA is found to be optimum. About 0.7% acrylic acid content results in excessive grafting and premature gelatin during the initial polymerization step. Rubbers of this type have an advantage in that they require smaller amounts of peroxides in order to produce sufficient cross-linking of the rubber phase in the final blend.

One may also prepare a rubber with pendant unsaturation by the ester interchange method or by selecting a vinyl type monomer which also contains a hydroxyl group which might be esterified with an acrylic acid type compound as described above. Suitable rubbers can also be prepared wherein the necessary pendant unsaturation is achieved by esterification of a rubber containing some carboxyl groups with unsaturated alcohols such as allyl alcohol, methallyl alcohol, crotyl alcohol, 2-cyclohexene-1-ol, etc.

The rigid phase of the polyblends of this invention may be prepared from many diverse monomers and mixtures of monomers. These would include alkenyl aromatic monomers of the general formula:

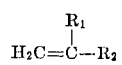

wherein $R_1$ is selected from the group comprising hydrogen, chlorine and methyl, and $R_2$ is an aromatic radical of from 6 to 10 carbon atoms, which may also contain substituents such as halogens, and alkyl groups attached to the aromatic nucleus. Examples of the foregoing would include styrene, alpha-methyl styrene, vinyl toluene, alpha-chlorostyrene, o-chlorostyrene, p-methylstyrene, alpha- and beta-vinyl naphthalene, etc.

Other monomers which are useful in the practice of this invention include those of the general formula:

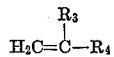

wherein $R_3$ is selected from the group comprising hydrogen and methyl and $R_4$ is selected from the group comprising

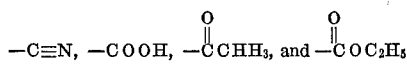

Examples of these compounds would include methylmethacrylate, acrylonitrile, methyl acrylate, acrylic acid, methacrylic acid, etc. This list is merely set forth as representative of the many monomers that one might use and should be taken as being all inclusive. Mixtures of the above mentioned monomers are also contemplated.

Preferably, one would use homopolymers and copolymers of methylmethacrylate for the rigid phase of these polyblends as well as terpolymers of methylmethacrylate, styrene derivatives and acrylonitrile. The preference of these arises because of the better weathering resistance of polymers which contain methyl methacrylate and/or acrylonitrile.

Especially preferred for use as the rigid phase are those polymers which contain at least 25 weight percent of methyl methacrylate and from zero to 75 weight percent of styrene or styrene derivatives and from zero to 75 weight percent of acrylonitrile, the foregoing percentages being based on the total weight of the rigid phase.

The rigid phase may vary from 80 to 98 weight percent based on the total weight of the polyblend.

PREPARATION OF THE RUBBER PHASE

Ethylene-propylene terpolymers.—Rubber A

The following is placed into a 5 liter 4-necked glass flask equipped with stirrer, thermometer, gas delivery tube and rubber syringe cap:

A solution of 15.0 grams (0.075 mol) of aluminum triisobutyl and 42.0 grams of decene-1 in 150 ml. of tetrachloroethylene is heated to boiling under reflux and nitrogen for two hours to form aluminum tridecyl. Aluminum chloride, 4.8 grams (0.038 mol), is dissolved in the resulting solution under nitrogen at 100° to 110° C. and the mixture cooled to room temperature. One hundred milliliters (100 ml.) of this solution is added over a period of 3 minutes with rapid stirring and under nitrogen at room temperature to a solution of 0.87 gram (0.005 mol) of vanadyl trichloride (vanadium oxytrichloride) in 2 liters of tetrachloroethylene contained in the polymerization vessel. An ethylene/propylene feed containing 75 mol percent of propylene is introduced at a rate of 2 liters per minute into the rapidly stirred violet-ping catalyst solution. Simultaneously, 10 ml. of a solution of 16.4 grams (0.20 mol) of 1,4-hexadiene in 90 ml. of tetrachloroethylene is added. The remainder of the diene solution is added dropwise, continuously over the first hour of polymerization. The composition of the ethylene/propylene feed is changed to 50 mol percent of propylene after the first two minutes of polymerization and maintained at this composition for the remainder of the run, which is carried out for two hours. The temperature rises from 30° to 40° C. during the first 10 minutes of polymerization, and is then cooled and maintained at 28° to 33° C. by external cooling for the remainder of the run. The terpolymer is isolated from the viscous solution by precipitation with 6 liters of n-butanol, washed with acetone and dried. This material is further extracted with benzene, precipitated, washed with acetone and dried. About 44 grams of elastomeric terpolymer is obtained which is found to contain about 30% by weight of propylene and to have an iodine number of about 7.5, corresponding to 2.5% by weight of diene. The ethylene content is, therefore, about 67.5%. The intrinsic viscosity (in tetrachloroethylene at 30° C.) is about 2.38.

Rubber B

This terpolymer is prepared according to the procedure used to prepare Rubber A using an ethylene/propylene weight ratio of 55/45 and about 5 weight percent of dicyclopentadiene as the diolefin.

Rubber C

This terpolymer is prepared according to the procedure used to prepare Rubber A only using an ethylene/propylene weight ratio of 55/45 and about 7.5 weight percent cyclooctadiene as the diolefin.

Ethylene-vinyl acetate terpolymers

Ethylene/vinyl acetate (55E/45VA) is chemically modified by two techniques (1) ester interchange and (2) partial hydrolysis followed by esterification. The direct polymerization of ethylene, vinyl acetate and diolefin is also possible.

Rubber D (1) Ester interchange method of preparation for EVA terpolymers.—Seventy-five grams of an ethylene/vinyl acetate (EVA) rubber containing 55 weight percent ethylene and 45 weight percent vinyl acetate is dissolved in 250 cc. of toluene and reacted with 150 grams of acrylic acid in the presence of 12.5 N aqueous $H_2SO_4$ or 85% $H_3PO_4$ as a reaction catalyst and 0.15 grams of hydroquinone as polymerization inhibitor in a stirred one liter flask. Reactions are carried out at 50–60° C. for 5 hours.

The resulting EVA is diluted with methyl ethyl ketone and separated by precipitation in methanol and analyzed by saponification followed by chromatographic determination of acrylic acid. The modified EVA rubber is found to contain 0.11% acrylic acid esters by weight.

Longer reaction times yield rubbers with a larger acrylic acid content.

An alternate method is to dissolve the EVA rubber in acrylic acid in the absence of solvents.

Rubber E

Rubber E is made according to the procedure of Rubber D. The reaction was allowed to proceed for 7 hours and the resulting modified EVA was found to contain about 0.3% acrylic acid esters by weight.

Rubber F

Rubber F is made according to the procedure used for Rubber D. The reaction was allowed to proceed for 11 hours and the resulting modified EVA was found to contain about 0.7% acrylic acid esters by weight.

(2) Hydrolysis followed by esterification method of preparation for EVA terpolymers.—EVA rubbers can also be modified by complete or partial hydrolysis to ethylene/vinyl alcohol or ethylene/vinyl alcohol/vinyl acetate. This is accomplished by methanolysis at room temperature in the presence of 1–2% sodium methoxide by weight based on the weight of the charged methanol in a dry solvent such a toluene. The resulting partially or completely hydrolyzed material is then reacted with small amount of acrylyl chloride, or crotonyl chloride, or oleyl chloride, or undecylenyl chloride or their anhydrides and finally, with an excess of acetyl chloride to give the desired modified rubbers with pendant unsaturation.

The most desirable modified rubbers contain from 2 to 5% by weight of the vinyl esters of undecylenyl acid or oleic acid or other unsaturated aliphatic groups of moderate reactivity (the double bond should not be conjugated with the carbonyl group and is preferably internal rather than terminal).

(3) Direct polymerization method of preparation for EVA terpolymers.—A third and more preferred method is the direct polymerization of ethylene/vinyl acetate/diolefin in autoclave reactors or other suitable polymerization vessels.

Acrylic rubbers

Acrylic rubbers are prepared by emulsion polymerization by use of the following formulation:

Rubber G

The following are added to a two liter glass polymerization vessel equipped with agitator; thermometer and graduated funnel, nitrogen inlet tube and condenser:

| Ingredient: | Quantity, g. |
|---|---|
| Distilled $H_2O$ | 400 |
| Sodium lauryl sulfate | 3.0 |
| Potassium persulfate | 0.1 |
| Ethyl acrylate | 50 |
| Butyl acrylate | 50 |
| Tert-dodecyl mercaptan | 0.2 |
| Allyl acrylate | 2.0 |

Polymerizations are conducted at 50° C. for 18 hours to insure complete conversion. The rubber is recovered by freezing and subsequent washing with a methanol/water mixture. Rubber G is found to have an allyl acrylate content of about 2% based on the total weight and to be essentially gel-free as evidenced by its solubility in toluene and styrene.

Rubber H

Rubber H is an acrylate copolymer prepared as Rubber G but containing about 2% by weight of allyl methacrylate instead of allyl acrylate.

Rubber J

Rubber J is an acrylate copolymer prepared as Rubber G above but containing about 3% by weight vinyl crotonate instead of allyl acrylate.

The following rubbers contain no diolefin with pendant unsaturation. They are included as controls to demonstrate the superior results obtained when using a rubber with pendant unsaturation in the practice of this invention.

Rubber K

Rubber K is a 50/50 weight ratio ethyl acrylate/butyl acrylate copolymer prepared as Rubber G.

Rubber L

Rubber L is the unmodified 55E/45VA EVA rubber used to prepare Rubber D.

Rubber M

Rubber M is an ethylene/propylene copolymer containing 43 mole percent ethylene-57 mole percent propylene.

The following examples are given in illustration of the invention and are not intended as limitations thereof. All parts and percentages are by weight unless otherwise specified.

EXAMPLE I

Step 1.—Prepolymerization step

Eight parts of Rubber A are dissolved in 92 parts of styrene in a reaction flask fitted with an agitator and a reflux condenser and a nitrogen inlet tube. 0.07% by weight (based on the weight of the monomer of ditertiary butyl peroxide (DTBP), 0.035% of tertiary butyl peracetate (TBPA) and 0.025% of tertiary dodecyl mercaptan (TDDM) are dissolved in the monomer. DTBP and TBPA are used as initiators while the TDDM is a chain transfer agent. The batch is heated to 95° C.±1° C. Phase inversion takes place after 2-3 hours (about 15% conversion) with the rubber phase becoming the dispersed phase. Heating is continued for an additional 1.5 to 2 hours (about 25% conversion). At the end of this time an additional charge of DTBP (0.36%) is made. Agitation and the nitrogen purge are maintained throughout the prepolymerization step.

Step 2.—Suspension polymerization

The following are charged to a pressure reactor fitted with an agitator.

| Ingredient: | Quantity |
|---|---|
| Initial polymerization syrup from Step 1 _g_ | 600 |
| Water _g_ | 700 |
| 5% aqueous solution of a copolymer of acrylic acid and 2-ethylhexyl acrylate as described in U.S. Patent 2,945,013 _cc_ | 40 |
| 20% aqueous solution of a sodium salt of a sulfonated napthalene formaldehyde condensate _cc_ | 15 |
| $Na_2SO_4$ _g_ | 3.3 |

The suspension is taken through a heating cycle of 1 hour at 120° C., 2 hours at 140° C. and 3 hours at 155° C. followed by cooling to 25 to 30° C. Sufficient agitation is maintained throughout the polymerization and cooling cycle to prevent agglomeration of the polymer particles. The resulting beads are washed with water and dried at 70° C. for about 10 hours.

Step 3.—Processing

The beads prepared in Step 2 are blended with 0.2 part of ditertiary butyl para-cresol and 0.15 part of a zinc stearate lubricant and extruded at 425-450° F. Test specimens are prepared by compression molding at 170-200° C. in a multiple cavity flash mold die. The resulting specimens are shaped like tensile-impact specimens according to ASTM D-1822.

Test results of this and other examples may be found in the tables.

Tensile strength and percent elongation tests are run according to ASTM D-638. Tensile impact tests are run according to ASTM D-1822. The tensile values are reported in pounds per square inch (p.s.i.) and tensile impact strength is reported in ft. lbs./in.$^2$.

Rubber particle size determination is carried out using a phase contrast microscope. The values reported in microns are measured at the end of the initial polymerization step and again after extrusion. The average size of the particles is reported in the tables.

D.G. or degree of grafting onto the rubber is determined as follows: From 1 to 3 grams of the final polymeric product is dissolved and/or dispersed in 45–50 ml. of either dimethyl formamide (DMF) or a 50/50 (by volume) DMF/methyl ethyl ketone (MEK) solvent pair. These solvents will dissolve the rigid phase but not the rubber or the rubber/rigid phase graft polymers. This mixture is centrifuged for 2 hours at 17,000 r.p.m. (about 37,000 G's). The supernatant liquid is removed and the procedure is repeated until the supernatant liquid no longer contains dissolved phase, as is evidenced by no precipitation of polymer as the supernatant liquid is discharged into an excess of methanol.

Methanol is then added to the insoluble residue to help remove the last traces of DMF. After centrifugation, the residue is dried under vacuum to a constant weight. The degree of grafting is expressed as follows:

$$\frac{\text{Weight of non-extractable solids in sample minus calculated grams of rubber in sample}}{\text{Calculated grams of Rubber in sample}} = \frac{\text{Degree of grafting}}{\text{(D.G.)}}$$

D.G. expresses the parts of rigid phase grafted (chemically attached to the rubber backbone) per hundred parts of original rubber.

The desired range of D.G. for the practice of this invention is 20 to 200 with a preferred range of 40 to 140.

Values greater than 200 may result in a loss in mechanical properties while values below 20 may result in a dispersed rubber phase which has insufficient adhesion to the rigid phase with resulting loss in mechanical properties.

"Percent Gel in Graft" is determined as follows: The vacuum dried residue from the D.G. extraction is dispersed in 45–50 ml. of toluene, centrifuged as above and the supernatant layer removed. This operation is repeated several times. The residue is then vacuum dried and the percent gel is calculated as follows:

$$\frac{\text{Grams of insuluble residue}}{\text{Weight of sample dispersed in toluene}} \times 100 = \text{Percent gel in graft}$$

In general, the higher the percent gel the better the impact strength of the final polymeric product.

EXAMPLES II–XXIV

Other polyblends containing 8 parts by weight of rubber and 92 parts by weight of rigid phase monomers are prepared as in Example I but using different monomers for the rigid phase and different rubbers in order to illustrate the wide range of materials that one might use in the practice of this invention. Polymerization conditions are also varied in order to illustrate various techniques which may be employed in the practice of this invention. The data on these examples are tabulated in Tables I, II and III.

The significant increase in impact strength and the preservation of the particulate size and structure of the rubber phase particles which is attained in the practice of this invention is illustrated by the values in the tables.

In Table I, Example VI, undergoes the greatest change in particle size and has the poorest tensile impact strength, i.e., 7.1. The polyblend of Example VI is prepared using an ethylene/propylene rubber which contains no pendant unsaturation and therefore could not be sufficiently cross-linked prior to extrusion. On the other hand, Examples I–IV, prepared using an ethylene/propylene terpolymer containing 2.5% by weight of a diolefin which provides the necessary pendant unsaturation, are able to maintain the particulate rubber size and structure during extrusion conditions. The preservation of the desired rubber phase size and structure results in products whose impact strengths are significantly higher than that of Example VI. Furthermore, Example VI has a D.G. value of below 20. Values below 40 suggest that the dispersed rubber phase is becoming dissociated from the rigid phase because of insufficient adhesion.

Example V is included to show that heat alone is insufficient to cross-link the pendant unsaturation. The use of a sufficient amount of initiator such as ditertiary butyl peroxide or other suitable initiators is necessary in order to cross-link the rubber.

TABLE I.—STYRENE POLYBLENDS (A) Initial Polymerization and Suspension Polymerization Variables

| Ex. | Rigid Phase | Rubber | Initial Polymerization | | | | | Post Addition, Percent DTBP | Suspension, Time/Temp. Cycle |
|---|---|---|---|---|---|---|---|---|---|
| | | | Percent DTBP | Percent TBPA | Percent TDDM | Temp., °C. | Time, hrs. | | |
| I | Styrene | A | 0.07 | 0.035 | 0.025 | 95 | 4.5 | 0.36 | 1 |
| II | do | A | | 0.035 | 0.025 | 95 | 5.0 | 0.21 | 1 |
| III | do | A | | 0.04 | | 95 | 5.0 | 0.2 | 2 |
| IV | do | A | | 0.04 | 0.025 | 95 | 5.0 | 0.2 | 2 |
| V | do | A | 0.1 | | 0.05 | 110 | 3.5 | | 4 |
| VI | do | M | 0.1 | | 0.05 | 110 | 3.5 | | 3 |

(B) Physical Properties of Styrene Polyblends

| Ex. | Rubber Particle Size | | D.G. | Percent Gel in Graft | Tensile, p.s.i. | | Percent Elongation | | Tensile Impact |
|---|---|---|---|---|---|---|---|---|---|
| | Initial | After Extrusion | | | Yield | Fail | Yield | Fail | |
| I | 13 | 13 | 103 | 90 | 2,560 | 2,600 | 3.0 | 34 | 55 |
| II | 20 | 20 | 90 | 72 | 3,200 | 3,000 | 3.2 | 29 | 49 |
| III | 15 | 12 | 77 | 63 | 3,640 | 3,200 | 3.3 | 43 | 44 |
| IV | 40 | 20 | 80 | 58 | 3,460 | 3,240 | 3.3 | 46 | 67 |
| V | 200 | 2 | 70 | 20 | 3,900 | 3,100 | 2.7 | 6.3 | 14 |
| VI | 40 | <1 | <14 | <10 | 4,100 | 3,900 | 2.4 | 5.0 | 7.1 |

Suspension cycle:

1 — 1 hr. at 120° C.
2 hrs. at 140° C.
3 hrs. at 155° C.

2 — 1 hr. at 120° C.
2 hrs. at 155° C.

3 — 2 hrs. at 110° C.
2 hrs. at 140° C.
1 hr. at 155° C.

4 — 2 hrs. at 130° C.
1 hr. at 140° C.
3 hrs. at 150° C.

5 — 1 hr. at 110° C.
1 hr. at 140° C.
1.5 hrs. at 155° C.

6 — 1 hr. at 110° C.
1 hr. at 140° C.
3 hrs. at 155° C.

Similar results are obtained when using rubbers with pendant unsaturation in conjunction with a styrene/acrylonitrile rigid phase (see Table II). Once again the greatest decrease in particle size upon processing and the poorest impact strength is obtained when using a rubber without pendant unsaturation. Example VII is prepared using a straight EVA rubber and is characterized by a drastic change in the morphology of the rubber phase and by the lowest impact strength in Table II as well as the lowest D.G. value. The substantially non cross-linked rubber particles of Example VII were smeared together during extrusion to form laminae rather than maintain the discrete size and structure that was obtained during initial polymerization. Example VIII is a repeat of Example VII only using an acrylate rubber without pendant unsaturation and equally poor results are obtained due to the lack of cross-linking sites. Examples IX to XIII using rubbers with pendant unsaturation and sufficient initiator exhibit excellent impact strengths. The significant improvement in physical properties of these examples over Examples VII–VIII is readily apparent upon examination of the data of Table II.

The examples in Table II, with the exception of Example XIII, are prepared using terpenolene as a chain transfer agent.

TABLE II.—SAN POLYBLENDS (A) Initial Polymerization and Suspension Polymerization Variables

| Ex.[1] | Rigid Phase (weight ratio) | Rubber | Initial Polymerization | | | | | Post Addition | | Suspension, Time/Temp. Cycle |
|---|---|---|---|---|---|---|---|---|---|---|
| | | | Percent DTBP | Percent TBPA | Percent Terpenolene | Temp., °C. | Time, hrs. | Percent DTBP | Percent Terpenolene | |
| VII | SAN (70/30) | L | 0.04 | 0.01 | | 95 | 3 | 0.16 | | 4 |
| VIII | SAN (70/30) | K | | | | 95 | 3 | 0.16 | | 4 |
| IX | SAN (70/30) | A | 0.04 | 0.01 | .085 | 90 | 2.5 | 0.16 | 0.2 | 4 |
| X | SAN (70/30) | A | 0.04 | 0.01 | .085 | 90 | 2.5 | 0.34 | 0.2 | 4 |
| XI | SAN (70/30) | B | 0.04 | 0.01 | .085 | 90 | 2.5 | 0.16 | 0.2 | 4 |
| XII | SAN (70/30) | C | 0.04 | 0.01 | .085 | 100 | 6 | 0.16 | 0.2 | 4 |
| XIII | SAN (70/30) | D | 0.04 | 0.35 | [2] 0.50 | 95 | 2 | 0.16 | | 5 |

(B) Physical Properties of SAN Polyblends

| Ex. | Rubber Particle Size | | D.G. | Percent Gel in Graft | Tensile, p.s.i. | | Percent Elongation | | Tensile Impact |
|---|---|---|---|---|---|---|---|---|---|
| | Initial | After Extrusion | | | Yield | Fail | Yield | Fail | |
| VII | 1-20 | <1-2 | 4 | 61 | | 8,620 | | 8 | 15 |
| VIII | 1-20 | <1-2 | 6 | 37 | 8,010 | 6,050 | 7.3 | 9 | 13 |
| IX | 4 | 2 | 43 | 32 | 5,600 | 5,100 | 4.6 | 26 | 40 |
| X | 4 | 2 | 59 | 87 | 5,400 | 5,000 | 4.4 | 33 | 61 |
| XI | 3 | 2 | 38 | 33 | 6,100 | 5,400 | 5.3 | 21 | 37 |
| XII | 4 | 2 | 44 | 76 | 5,970 | 6,030 | 4.5 | 18.8 | 49 |
| XIII | 0.5-4 | 0.5-1.5 | 41 | 36 | 7,410 | 6,580 | 5.1 | 22 | 22 |

[1] Examples IX–XII contained 21.6% of heptane diluent based on the total weight.
[2] Using 0.05% TDDM instead of terpenolene.

Table III lists the test results obtained when using methyl-methacrylate polymers and copolymers with various rubbers.

Once again, Examples XVI and XIX prepared using rubbers without pendant unsaturation show the greatest decrease in particle size after extrusion and the porest impact strength.

The EVA rubber used in Example XVIII modified with 0.7% acrylic ester was found to give premature gelation due to cross-linking prior to phase inversion and excessive grafting (about 500 parts of polystyrene grafted per 100 of rubber). EVA with lower acrylic ester content (Examples XIII and XVII) resulted in blends of improved impact strengths and better retention of particulate rubber structure. EVA rubbers may also be modified with a less reactive double bond to give equally good results. This could be achieved by reacting hydrolyzed EVA rubbers with crotonic acid or oleic acid or 3-butenoic acid. This allows a less reactive pendant unsaturation with less risk of gelation and excessive grafting. More double bonds are thus available for cross-linking.

Excellent results are obtained using ethylene/propylene terpolymers as is evidenced by the values reported for the examples prepared with rubbers that contain pendant unsaturation.

TABLE III.—MMA POLYBLENDS (A) Initial Polymerization and Suspension Polymerization Variables

| Ex.[1] | Rigid Phase (weight ratio) | Rubber | Initial Polymerization | | | | Post Addition, percent DTBP | Suspension Time/Temp., Cycle |
|---|---|---|---|---|---|---|---|---|
| | | | Percent TBPA | Percent Terpenolene | Temp., °C. | Time, hrs. | | |
| XIV | MMA/S, 50/50 | A | 0.01 | 0.30 | 100 | 5 | 0.36 | 4 |
| XV | MMA/S, 30/70 | B | 0.01 | 0.30 | 100 | 4.5 | 0.36 | 4 |
| XVI | MMA/S, 75/25 | L | 0.035 | 0.50 | 95 | 5.5 | 0.24 | 5 |
| XVII | MMA/S, 75/25 | E | 0.035 | 0.50 | 95 | 7.0 | 0.24 | 5 |
| XVIII | MMA/S, 75/25 | F | 0.035 | 0.50 | batch gelled within 1 hr. | | | |
| XIX | MMA/S, 75/25 | K | 0.035 | 0.40 | 95 | 3.5 | 0.24 | 5 |
| XX | MMA/S, 75/25 | G | 0.035 | 0.40 | 95 | 5.0 | 0.36 | 6 |
| XXI | MMA/S, 75/25 | H | 0.035 | 0.40 | 95 | 6.5 | 0.36 | 6 |
| XXII | MMA/S, 75/25 | J | 0.035 | 0.40 | 95 | 4.0 | 0.24 | 6 |
| XXIII | MMA | B | 0.02 | 0.025 | 120 | 2.0 | 0.36 | 6 |
| XXIV | MMA/S/AN, 41/42/17 | C | 0.01 | 0.085 | 85 | 6.0 | 0.34 | 3 |

(B) Physical Properties of MMA Polyblends

| Ex. | Rubber Particle Size | | D.G. | Percent Gell in Graft | Tensile, p.s.i. | | Percent Elongation | | Tensile Impact |
|---|---|---|---|---|---|---|---|---|---|
| | Initial | After Extrusion | | | Yield | Fail | Yield | Fail | |
| XIV | 5 | 6 | 73 | 68 | 5,300 | 4,600 | 4.8 | 25 | 46 |
| XV | 4 | 5 | 68 | 51 | 6,320 | 5,150 | 5.8 | 29 | 34 |
| XVI | 1.3 | 0.5-1 | 31 | 31 | 8,730 | 6,890 | 7.3 | 19.2 | 21 |
| XVII | 2-8 | 1-8 | 43 | 33 | 8,180 | 6,000 | 7.9 | 30.6 | 29 |
| XVIII | Batch gelled | | | | | | | | |
| XIX | 1-14 | <1 | 16 | 21 | | 9,050 | | 7.8 | 10 |
| XX | 1-2 | 1-2 | 48 | 39 | 6,680 | 6,300 | 6.4 | 17.2 | 27 |
| XXI | 1-3 | 0.5-2 | 51 | 41 | 6,400 | 6,400 | 5.8 | 11.2 | 24 |
| XXII | 1-2 | 1-2 | 43 | 35 | 7,800 | 7,200 | 6.8 | 11 | 18 |
| XXIII | n.a. | n.a. | 48 | 47 | 6,750 | 6,010 | 6.3 | 15 | 29 |
| XXIV | n.a. | n.a. | 51 | 42 | 5,650 | 5,200 | 4.8 | 18.0 | 36 |

[1] Examples XIV–XXIV use 0.04% DTBP and 0.05% TDDM in the initial polymerization step.
n.a.=not available.

Other examples are prepared using varying amounts of rubbers with the necessary pendant unsaturation. Polyblends containing as low as 2% and as high as 20% by weight of rubber are found to result in products that have excellent physical properties and especially high impact strength.

These polyblends are prepared in accordance with the teachings of this invention using a rubber with the necessary pendant unsaturating which is cross-linked after phase inversion and prior to processing. It should be further stated that polyblends prepared from rubbers without pendant unsaturation or prepared by relying on heat alone to cross-link the rubber phase had markedly inferior properties when compared to the polyblends prepared according to the practice of this invention.

It is obvious that many variations may be made in the products and processes set forth above without departing from the spirit and scope of this invention.

What is claimed is:
1. A process for the preparation of a polyblend comprising:
   (A) from 80 to 98 percent by weight, based on the weight of the total composition, of a rigid polymer which is the polymerization product of at least one monomer selected from the group consisting of methyl methacrylate, acrylonitrile, and alkenyl aromatic monomers of the general formula:

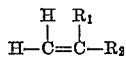

wherein $R_1$ is selected from the group consisting of hydrogen and methyl and $R_2$ is an aromatic radical of from 6 to 10 carbon atoms, and
   (B) from 2 to 20 percent by weight, based on the weight of the total composition, of a crosslinked elastomeric polymer selected from the group consisting of:
      (1) interpolymers of a non conjugated diolefin containing from 5 to 22 carbon atoms and one terminal double bond with at least one lower alpha mono olefin comonomer, said interpolymer containing from 1–20% by weight diolefin, and
      (2) modified interpolymers of a lower alpha monoolefin and a comonomer selected from the group consisting of vinyl esters, vinyl carboxylates and vinyl alcohols, said interpolymer having been modified by partial esterification with an unsaturated reagent to provide pendant unsaturation, said elastomer having a particle size of from 0.5 to 10 microns; said process comprising (1) dissolving from 2 to 20 percent by weight based on the weight of the total composition, of a substantially non-cross-linked elastomeric polymer with pendant unsaturation as defined in (B) above in 80 to 98 percent by weight of the monomeric moiety of part (A) above, (2) mass polymerizing the mixture to about 5 to 30% conversion to cause phase inversion of the continuous rubber phase to a dispersed rubber phase of discrete particles, (3) then cross-linking the discrete rubber particles by free-radical catalysis and (4) completing the polymerization of the monomeric moiety.

2. The process as in claim 1 wherein the monomeric moiety is a 75/25 weight ratio of methylmethacrylate/styrene and the elastomeric polymer is an ethylene/propylene/1,4-hexadiene terpolymer.

3. The process as in claim 1 wherein the monomeric moiety is a 30/70 weight ratio of methylmethacrylate/styrene and the elastomeric polymer is an ethylene/propylene/dichlopentadiene terpolymer.

4. The process as in claim 1 wherein the monomeric moiety is a 70/30 weight ratio of styrene/acrylonitrile and the elastomeric polymer is an ethylene/propylene/dicyclopentadiene terpolymer.

5. The process as in claim 1 wherein the monomeric moiety is methylmethacrylate and the elastomeric polymer is an ethylene/vinyl acetate copolymer which contains pendant acrylic ester groups.

6. A polyblend comprising:
   (A) from 80 to 98 percent by weight, based on the weight of the total composition, of a rigid polymer which is the polymerization product of at least one monomer selected from the group consisting of methyl methacrylate, acrylonitrile and alkenyl aromatic monomers of the general formula:

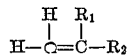

wherein $R_1$ is selected from the group consisting of hydrogen and methyl and $R_2$ is an aromatic radical of from 6 to 10 carbon atoms, and
   (B) from 2 to 20 percent by weight based on the weight of the total composition, of a cross-linked elastomeric polymer selected from the group consisting of:
      (1) interpolymers of a non conjugated diolefin containing 5 to 22 carbon atoms and one terminal double bond with at least one lower alpha mono olefin comonomer, said interpolymer containing from 1–20% by weight diolefin, and
      (2) modified interpolymers of a lower alpha mono olefin and a comonomer selected from the group consisting of vinyl esters, vinyl carboxylates and vinyl alcohols, said interpolymer having been modified by partial esterification with an unsaturated reagent to provide pendant unsaturation, said elastomer having a particle size of from 0.5 to 10 microns and having been prepared by a process comprising (1) dissolving from 2 to 20 percent by weight based on the weight of the total composition of a substantially non-cross-linked elastomeric polymer with pendant unsaturation as defined in (B) above in 80 to 98 percent by weight of the monomeric moiety of part (A) above, (2) mass polymerizing the mixture to about 5 to 30% conversion to cause phase inversion of the continuous rubber phase to a dispersed rubber phase of discrete particles (3) then cross-linking the discrete rubber particles by free-radical catalysis and (4) completing the polymerization of the monomeric moiety.

7. A polyblend as in claim 6 wherein the monomeric moiety is a 75/25 weight ratio of methylmethacrylate/styrene and the elastomeric polymer is an ethylene/propylene/1,4-hexadiene terpolymer.

8. A polyblend as in claim 6 wherein the monomeric moiety is a 30/70 weight ratio of methylmethacrylate/styrene and the elastomeric polymer is an ethylene/propylene/dicyclopentadiene terpolymer.

9. A polyblend as in claim 6 wherein the monomeric moiety is a 70/30 weight ratio of styrene/acrylonitrile and the elastomeric polymer is an ethylene/propylene/dicyclopentadiene terpolymer.

10. A polyblend as in claim 6 wherein the monomeric moiety is methylmethacrylate and the elastomeric polymer is an ethylene/vinyl acetate copolymer which contains pendant acrylic ester groups.

References Cited

UNITED STATES PATENTS

| 3,162,696 | 12/1964 | Zimmerman et al. | 260—878 |
| 3,218,373 | 11/1965 | Salyer | 260—878 |
| 3,328,488 | 6/1967 | Declaretaz | 260—880 |

FOREIGN PATENTS

| 1,005,681 | 9/1965 | Great Britain. |

MURRAY TILLMAN, Primary Examiner

M. J. TULLY, Assistant Examiner

U.S. Cl. X.R.

260—876, 879, 880, 895

PO-1050
(5/69)

UNITED STATES PATENT OFFICE
CERTIFICATE OF CORRECTION

Patent No. 3,461,188 (HP-3)        Dated September 9, 1969

Inventor(s)   Massimo Baer

It is certified that error appears in the above-identified patent and that said Letters Patent are hereby corrected as shown below:

Column 5, lines 12-15, that portion of the third formula reading "CH" should read - - OC - -; column 5, line 59 "ping" should read - - pink - -. Column 10, Table I(B), Ex. III, the Tensile Impact reading "44" should read - - 47 - -; column 10, Table I(B), Ex. IV, the Tensile Impact reading "67" should read - - 64 - -. Column 11, line 60, "porest" should r - - poorest - -. Column 12, Table III(A), Ex. XXIV, the Temp. °C. reading "85" should read - - 95 - -. Column 14, lines 3-5 the portion of the formula reading " $\underset{|}{H}$ " should read - -
$-\underset{|}{\overset{H}{C}}=$      $-\overset{}{\overset{}{C}}=$

SIGNED AND
SEALED
APR 28 1970

(SEAL)
Attest:

Edward M. Fletcher, Jr.
Attesting Officer

WILLIAM E. SCHUYLER, JR.
Commissioner of Patents